US009700953B2

(12) United States Patent
Flewelling et al.

(10) Patent No.: US 9,700,953 B2
(45) Date of Patent: Jul. 11, 2017

(54) ADAPTIVE WELDING APPARATUS, CONTROL SYSTEM, AND METHOD OF CONTROLLING AN ADAPTIVE WELDING APPARATUS

(71) Applicant: Honda Motor Co., Ltd., Minato-ku, Tokyo (JP)

(72) Inventors: Eric Flewelling, Columbus, OH (US); Paul C. Edwards, II, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 354 days.

(21) Appl. No.: 14/314,702

(22) Filed: Jun. 25, 2014

(65) Prior Publication Data
US 2015/0375325 A1 Dec. 31, 2015

(51) Int. Cl.
B23K 9/095 (2006.01)
B25J 9/16 (2006.01)

(52) U.S. Cl.
CPC ........... *B23K 9/0956* (2013.01); *B25J 9/1684* (2013.01); *G05B 2219/45135* (2013.01); *Y10S 901/42* (2013.01)

(58) Field of Classification Search
CPC ................. B23K 9/0956; B25J 9/1684; G05B 2219/45135; Y10S 901/42
USPC .......... 219/76.14, 78.01, 109, 124.34, 130.1, 219/130.21, 130.51
See application file for complete search history.

(56) References Cited

U.S. PATENT DOCUMENTS

| 4,532,404 | A | * | 7/1985 | Boillot | B23K 9/0956 219/124.34 |
|---|---|---|---|---|---|
| 4,825,038 | A | | 4/1989 | Smartt et al. | |
| 4,849,600 | A | | 7/1989 | Herschitz et al. | |
| 4,877,940 | A | * | 10/1989 | Bangs | B23Q 35/127 219/124.34 |
| 5,708,253 | A | | 1/1998 | Bloch et al. | |
| 5,852,273 | A | | 12/1998 | Ryudo et al. | |
| 5,917,726 | A | | 6/1999 | Pryor | |
| 6,051,805 | A | | 4/2000 | Vaidya et al. | |
| 6,133,545 | A | | 10/2000 | Okazaki et al. | |
| 6,140,825 | A | | 10/2000 | Fujii et al. | |
| 6,236,017 | B1 | | 5/2001 | Smartt et al. | |
| 6,359,566 | B2 | | 3/2002 | Kawai | |
| 6,441,342 | B1 | | 8/2002 | Hsu | |
| 6,744,011 | B1 | | 6/2004 | Hu et al. | |
| 6,768,974 | B1 | | 7/2004 | Nanjundan et al. | |

(Continued)

*Primary Examiner* — Thien S Tran
(74) *Attorney, Agent, or Firm* — Arent Fox LLP

(57) ABSTRACT

An apparatus for adaptive welding is provided. The apparatus includes an arc welding robot having a repositionable arc welding gun. The arc welding robot is configured to position the arc welding gun at a location of a joint formed at an interface of at least a first workpiece and a second workpiece. The apparatus further includes a thermographic imager that is configured to measure a temperature of at least one of the first workpiece and the second workpiece at the location. The apparatus also includes a controller that is in signal communication with the arc welding robot and the thermographic imager. The controller is configured to select a weld schedule for forming a weld at a location based at least in part on the temperature measured with the thermographic imager and a joint profile of the location before the weld is formed.

20 Claims, 3 Drawing Sheets

(56) References Cited

U.S. PATENT DOCUMENTS

2013/0082039 A1    4/2013  Quintana et al.
2013/0277344 A1*  10/2013  Guymon .................. B23K 5/18
                                                       219/125.1

* cited by examiner

ADAPTIVE WELDING APPARATUS, CONTROL SYSTEM, AND METHOD OF CONTROLLING AN ADAPTIVE WELDING APPARATUS

BACKGROUND

The subject matter disclosed herein relates to an adaptive welding apparatus and an adaptive welding apparatus control system and, more particularly, to a robotic adaptive welding apparatus control system and methods of controlling a robotic adaptive welding apparatus.

Welding is an important and widely used industrial manufacturing process. Welding apparatus and control systems for welding apparatus are well known in the art. Controlling the quality and efficiency of a welding process is one way industrial manufacturers can optimize the operation of welding apparatus.

Robotic welding apparatus are used in a variety of industrial manufacturing settings to produce high quality and repeatable welds. Many different aspects of the process may impact the outcome and effect the quality of welds produced by a robotic welding apparatus. The input parameters, environmental conditions, and workpiece parameters are just a few variables that may have an impact on the quality of the welds produced and the efficiency of the robotic welding apparatus.

A welding apparatus and a control system for a welding apparatus configured to optimize the input parameters for each weld formed by the apparatus in response to a variety of conditions or variables is desirable.

SUMMARY

According to one aspect, an apparatus for adaptive welding includes an arc welding robot having a repositionable arc welding gun. The arc welding robot is configured to position the arc welding gun at a location of a joint formed at an interface of a first workpiece and a second workpiece. The apparatus further includes a thermographic imager that is configured to measure a temperature of at least one of the first workpiece and the second workpiece at the location. The apparatus also includes a controller that is in signal communication with the arc welding robot and the thermographic imager. The controller is configured to select a weld schedule for forming a weld at the location based at least in part on the temperature measured with the thermographic imager and a joint profile of the location before the weld is formed.

According to another aspect, a method for controlling an adaptive welding apparatus is provided. The adaptive welding apparatus includes a welding robot with a repositionable arc welding gun and a thermographic imager. The method includes positioning the arc welding gun by a controller in signal communication with the arc welding robot and the thermographic imager at a location of a joint formed at an interface of a first workpiece and a second workpiece. A temperature including at least one of an initial temperature, a temperature rate of change, and a final temperature, of at least one of the first workpiece and the second workpiece at the location is measured with the thermographic imager. The controller receives the at least one measured temperature from the thermographic imager and selects a weld schedule for forming a weld at the location based at least in part on the at least one measured temperature and a joint profile of the location before the weld is formed. The controller transmits an operational control signal to the arc welding robot to activate the arc welding gun to form the weld and the arc welding gun forms the weld.

According to a further aspect, a control system for an adaptive welding apparatus is provided. The adaptive welding apparatus includes an arc welding robot with a repositionable arc welding gun and a thermographic imager. A controller is in signal communication with the arc welding robot and the thermographic imager. The controller is configured to position the thermographic imager at a location of a joint formed at an interface of a first workpiece and a second workpiece to measure a at least one temperature of at least one of the first workpiece and the second workpiece. The controller is also configured to select a weld schedule for forming a weld at the location based at least in part on the of the at least one temperature measured with the thermographic imager and a joint profile of the location before the weld is formed.

BRIEF DESCRIPTION OF THE DRAWINGS

Other aspects and advantages of certain embodiments will become apparent upon consideration of the following detailed description, wherein similar structures have similar reference numerals.

DETAILED DESCRIPTION

Figure 1:
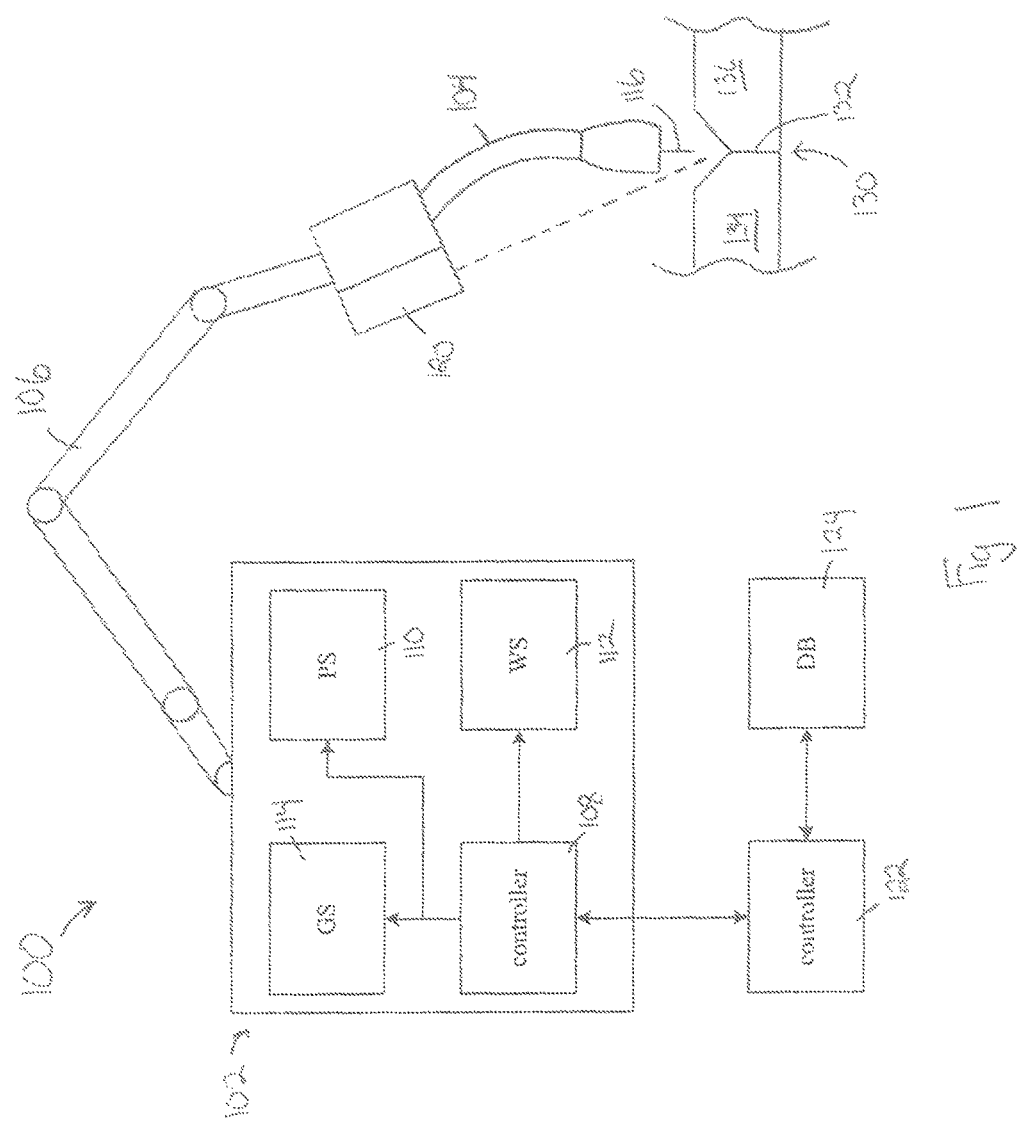
FIG. 1 is a schematic representation of an exemplary adaptive welding apparatus.

Referring initially to FIG. 1, a schematic representation of an exemplary adaptive welding apparatus 100 is depicted. The adaptive welding apparatus 100 includes an arc welding robot 102, which includes a repositionable arc welding gun 104. The arc welding robot 102 may reposition the arc welding gun 104 by repositioning means 106 well known in the art. For example, the repositioning means 106 may take the form of an articulated arm capable of moving the welding gun 104 through multiple axis. Alternatively, in some embodiments, the repositioning means 106 may take the form of a frame with guide rails (not shown) that limits the motion of a single axis or plane. The arc welding robot 102 also includes a robot controller 108, a power supply 110 (PS), a consumable wire spool 112 (WS), and a shroud gas supply 114 (GS).

Still referring to FIG. 1, the arc welding robot 102 is configured such that the arc welding gun 104 is in communication with the appropriate components for an arc welding process. For example, the consumable wire spool 112 may be placed anywhere that is advantageous to feed wire to the arc welding gun 104. Also, the power supply 110 and the shroud gas supply 112 are in electrical and fluid communication, respectively, with the arc welding gun 104. It is contemplated that the configuration of the arc welding robot 102 may take any form known to those of ordinary skill in the art.

It is contemplated that the arc welding gun 104 is a standard configuration for performing an arc welding process. The embodiment shown in FIG. 1 is representative of a standard metal-inert-gas (MIG) set-up using a consumable wire 116 that forms an arc and is consumed in the process. The shroud gas supply 114 (GS) is necessary to prevent oxidation during the welding process. It is also contemplated that different forms of welding may be used. In some embodiments, an arc welding process with a non-consumable electrode (not shown) may be used. Alternatively, in some embodiments, the adaptive welding apparatus 100 may include any type of welding equipment that may be automated or manually operated.

As shown in FIG. 1, the adaptive welding apparatus 100 further includes a thermographic imager 120 and an adaptive welding controller 122. In some embodiments, the adaptive welding controller 122 is in electronic communication with a weld database 124. It is contemplated that the adaptive weld controller 122 is in signal communication with the weld database 124 and the robot controller 108 in certain embodiments. Alternatively, in other embodiments, the adaptive weld controller 122 may include the weld database 124. In certain embodiments, the robot controller 108 contains the adaptive weld controller 122 and the weld database 124. The configuration of the controllers 108, 122 may be related to the type and/or configuration of the welding equipment that is part of the adaptive welding apparatus 100.

The robot controller 108 and the adaptive weld controller 124 may include one or more processors, memory and/or one or more programmable hardware elements. As used herein, the term "controller" is intended to include any types of processors, CPUs, microcontrollers, digital signal processors, or other suitable devices capable of executing software instructions. Further, memory may include a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which configuration data and programs may be stored and/or data communications may be buffered. The term "memory" may also include other types of known or future developed memory or combinations thereof.

Still referring to FIG. 1, the robot controller 108 controls the positioning of the arc welding gun 104 during the welding process. The arc welding gun 104 is moved into position to weld at a location of a joint 130 formed by an interface 132 between a first workpiece 134 and a second workpiece 136. A part (not shown) includes at least the first workpiece 134 and the second workpiece 136. It is contemplated that the part (not shown) may include a plurality of workpieces (not shown) beyond the portions of the workpieces 134, 136 depicted that may form a plurality of joints 130 that require welding by the adaptive welding apparatus 100. It is also contemplated that in some embodiments, the interface 132 may be formed between three or more workpieces (not shown) and that the part (not shown) may include a plurality of joints formed by such interfaces. It is also contemplated that the thermographic imager 120 may be repositionable in a variety of ways. The thermographic imager 120 may be utilized to measure a temperature of the joint 130 before the welding process begins. In some embodiments, the thermographic imager 120 is attached to a portion of the arc welding gun 104 and/or the repositioning means 106 such that the temperature measurements may be taken of the joint 130 before a welding process begins for every joint 130 a part (not shown) may have. It is contemplated that when the thermographic imager 120 measures the temperature of a joint 130, that the temperature of at least a portion of the first workpiece 134 and/or at least a portion of the second workpiece 136 in the proximity of the joint 130 is measured.

Figure 2:
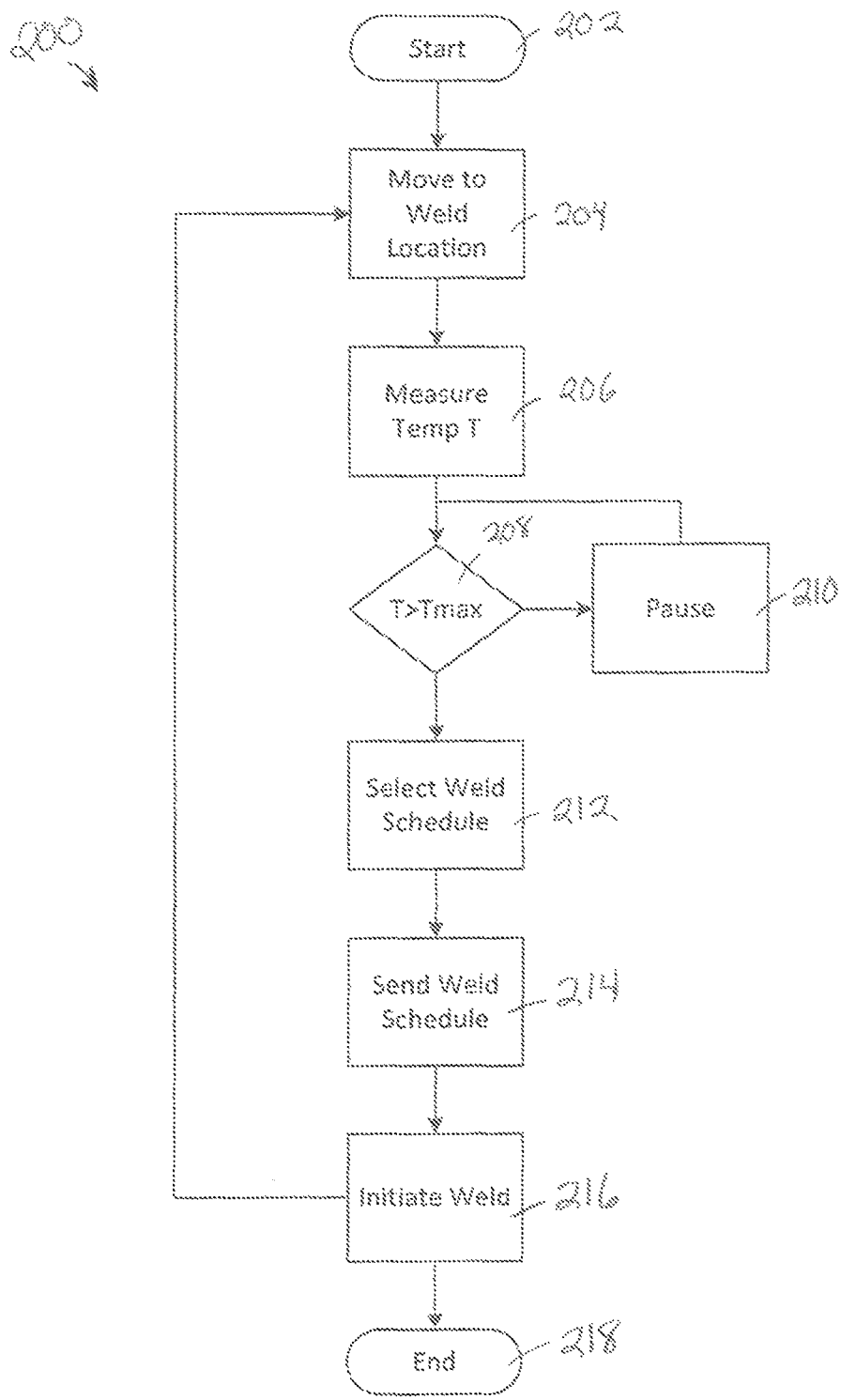
FIG. 2 is a flow chart depicting an exemplary adaptive welding process.

Now referring to FIG. 2, a flowchart depicting an exemplary adaptive weld process 200 using the adaptive welding apparatus 100 of FIG. 1 is shown. At the start block 202, the part (not shown) that includes at least the first workpiece 134 and the second workpiece 136 is placed in position to be welded at the joint 130. The robot controller 108 positions at least the arc welding gun 104 in position at a weld location of the joint 130 in block 204. In block 206, the thermographic imager 120 measures at least one temperature (T) of the joint 130 at the weld location. In one embodiment, the temperature (T) includes one or more temperature measurements, such as a sequence of temperature measurements that includes one or more of the following: an initial temperature (Ti), a temperature rate of change (dT), a final temperature (Tf), and any suitable combination thereof. Alternatively, the temperature (T) may include a series of temperatures measured with predefined time delays between measurement. The temperature (T) is compared to a maximum temperature (Tmax) by the adaptive weld controller 122. In one embodiment, if the final temperature (Tf) is equal to or greater than Tmax, the adaptive weld controller 122 will signal the robot controller 108 to pause the process. It is contemplated that Tmax is a predetermined value that implies a maximum amount of heat has already been transferred into the part. The block 210 represents a pause in the process to allow the part to cool. During the pause in block 210, the thermographic imager 120 monitors the temperature of the joint 130. In some embodiments, the monitoring may be continuous so that the process may start as soon as an appropriate temperature is achieved. Alternatively, the pause may include a specific time delay to allow the temperature of the joint 130 to fall sufficiently below Tmax such that welding the joint 130 should not raise the next temperature measurement by the thermographic imager 120 above Tmax.

Still referring to FIG. 2, once an appropriate Tf is measured by the thermographic imager 120, either just below Tmax or some predetermined value below Tmax, the adaptive weld controller 122 will proceed to the next block. In block 212, the adaptive weld controller 122 selects a weld schedule based on at least a joint profile and the sequence of temperatures measured by the thermographic imager 120. It is contemplated that the weld schedule may include one or more of the parameters that may be adjusted by the adaptive weld controller 122. The joint profile may include some or all of the relevant information about a specific joint 130 that may be required or useful when the adaptive weld controller 122 selects a weld schedule. After the weld schedule is selected by the adaptive weld controller 122, the process moves to the next block. In block 214, the adaptive weld controller 122 sends an operational control signal containing a command signal to adjust at least one parameter according to the selected weld schedule to the arc welding robot 102. Upon receipt of the signal, the arc welding robot 102 proceeds to activate the arc welding gun 104 in block 216 to form the weld at the desired location on the joint 130. The adaptive weld process 202 may then return back to block 204 and move to the next desired location on the joint 130 and repeat the above steps until all joints 130 at a plurality of locations on a part (not shown) are welded. Once all of the locations forming a joint 130 have been welded, the adaptive welding process 200 proceeds to the end block 218.

It is contemplated that in some embodiments, the adaptive weld process 200 may complete all the welds for every joint 130 on a part (not shown). Alternatively, in some embodiments, a series of arc welding robots 102 may be placed in proximity to each other along a production path. A part (not shown) may be moved by means known to one having ordinary skill in the art from a first arc welding robot 102 in a sequence through a plurality of stations, each containing an independent arc welding robot 102. A separate adaptive welding process 200 may be performed at each station where only a portion of the total number of joints 130 are welded.

Figure 3:
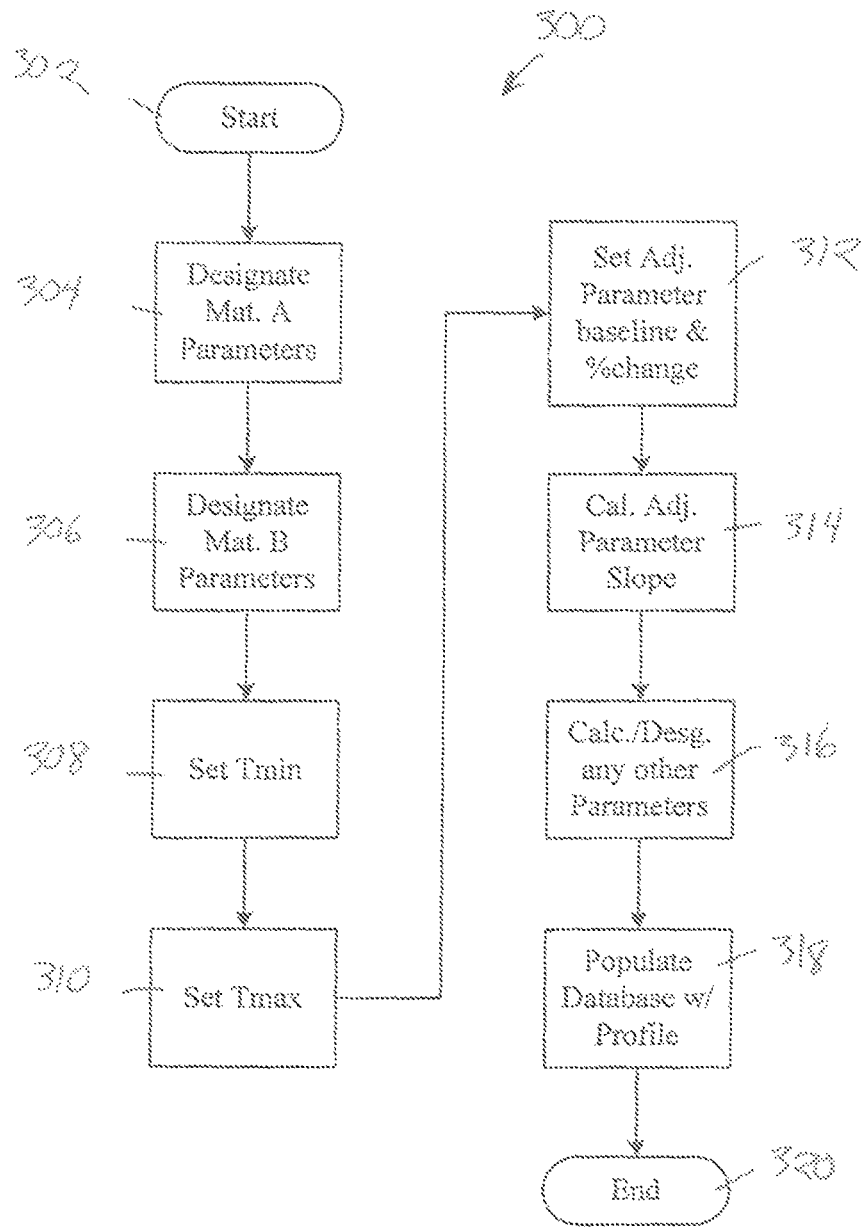
FIG. 3 is a flow chart depicting a process of creating a joint profile.

Turning to FIG. 3, a flowchart depicting a joint profile creation process 300 is shown. The joint profile creation process 300 is performed before a part can be processed by the adaptive welding apparatus 100. In one embodiment, once completed, one or more joint profiles are stored in the weld database 124. Alternatively, in certain embodiments, the joint profiles may be stored in the adaptive welding controller 122 or the robot controller 108. In some embodiments, all of the plurality of workpieces 134, 136 may be made of the same material and a single joint profile may be sufficient for completing the adaptive weld process 200 for a part (not shown). Alternatively, multiple types of materials that may have different physical properties requiring different welding parameters may be used to form more than one joint 130 and multiple weld schedules may be necessary.

Still referring to FIG. 3, the joint profile creation process 300 is started by the user in block 302. In the next block 304, the user designates the material parameters for a first material A. The process 300 continues in block 306 and the user designates the material parameters for a second material B if necessary. In block 308, a minimum temperature Tmin is determined by comparing and selecting a lower value between the values entered for the different materials A and B. The temperature Tmin may be the minimum temperature for a metallurgical change for the given material, for example. Next, in block 310, the maximum temperature Tmax is determined by comparing and selecting the higher value between the values entered for the different materials A and B. The temperature Tmax may be the maximum temperature for a select metallurgical change for the given material, for example. In the next block 312, the user enters a weld parameter baseline (Sb) and an amount or a percentage (S %) that the baseline may be changed for a given weld schedule. In one embodiment, only one weld parameter may be adjusted in an adaptive weld process 200. Alternatively, in other embodiments more than one weld parameter may be adjusted for a given joint 130. In the block 312, a number of parameters that may be adjusted during the adaptive weld process 200 may require the baseline (Sb) and the change in the percentage (S %) for each parameter to be entered by the user. In the block 314, a slope is calculated using Tmax, Tmin, Sb, and S %. The slope will be used to determine how much a weld parameter may be changed for a specific joint 130 depending on the temperature measurements made by the thermographic imager 122. The next block 316 permits the user to populate any other required or optional information for the profile. In the block 318, in one embodiment the joint profile information is stored in the weld database 124.

It is contemplated that in some embodiments, the weld schedules may include different variables and/or values based on the material parameters and/or the welding technique to be utilized by the adaptive welding apparatus 100. Some non-limiting examples of weld parameters that may be adjusted during the adaptive welding process 200 may include a travel speed of the arc welding gun 104, a voltage and/or a current applied during the welding process, a wire feed speed of the consumable wire spool 112, and any suitable combination thereof. It is also contemplated that the schedules may be created and selected by a variety of methods. For example, in one embodiment, the adaptive weld controller 122 populates a number of tables for the adjustable parameter of an adaptive weld process 200. The tables may correspond to different temperature ranges. During the adaptive weld process 200, the adaptive weld controller 122 selects the table and the value of the adjustable parameter based at least in part on the sequence of temperatures measured by the thermographic imager 120. Alternatively, the adaptive weld interface may use an algorithm that includes at least the sequence of temperature measurements and the joint profile. In one embodiment, the algorithm calculates a heat input into a part during the adaptive welding process 200 and predicts an amount of heat required to complete a next weld. The adaptive weld controller 122 may then adjust one or more welding parameters to complete the weld such that the welding process does not heat the part to a temperature greater than Tmax. Alternatively, if the results of the algorithm show that the weld cannot be completed without the temperature of the part exceeding Tmax, the adaptive weld controller 122 may signal the robot controller 108 to pause the process until a temperature is measured by the thermographic imager 120 that will allow a weld to be completed without exceeding Tmax as predicted by the algorithm.

It is contemplated that in some embodiments, the thermographic imager 120 includes an infrared camera. In other embodiments, the thermographic imager includes other suitable technologies capable of measuring a temperature or a sequence of temperatures of the joint 130 at a location away from the joint. Alternatively, thermal measurement technology may be placed in contact with the first workpiece 134 and/or the second workpiece 136 automatically before and after the weld process is completed is also contemplated. One having ordinary skill in the art may understand a variety of methods or technologies capable of measuring the temperature or sequence of temperatures of the joint 130 before a welding process.

It is also contemplated that in some embodiments the thermographic imager 120 is used for other purposes along with measuring the temperature. For example, if the image quality is sufficient, the images generated may be used to confirm the location of the arc welding gun 104 and the consumable wire 116 relative to the joint 130 before and/or during the adaptive weld process 200. Alternatively, the quality of the weld after the welding process is completed may be inspected. One having ordinary skill in the art would understand the capabilities of a visual inspection system included with or as part of the thermographic imager 120 and how it may be applied advantageously to the adaptive weld process.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments.

What is claimed is:
1. An adaptive welding apparatus, comprising:
   an arc welding robot including a repositionable arc welding gun, the arc welding robot configured to position the arc welding gun at a location of a joint formed at an interface of a first workpiece and a second workpiece;

a thermographic imager configured to measure a temperature of at least one of the first workpiece and the second workpiece at the location; and a controller in signal communication with the arc welding robot and the thermographic imager, the controller configured to select a weld schedule for forming a weld at the location based on the temperature measured with the thermographic imager and a joint profile of the location before the weld is formed, wherein the joint profile is determined based on material properties of the first workpiece and the second workpiece.

2. The adaptive welding apparatus of claim 1, wherein the controller is configured to transmit an operational control signal to the arc welding robot to activate the arc welding gun to form the weld.

3. The adaptive welding apparatus of claim 1, wherein the temperature includes one or more of the following temperature measurements: an initial temperature, a temperature rate of change, and a final temperature of at least one of the first workpiece and the second workpiece at the location.

4. The adaptive welding apparatus of claim 1, wherein the controller is configured to transmit an operational control signal to the arc welding robot comprising at least one parameter adjustment to the arc welding robot for the selected weld schedule.

5. The adaptive welding apparatus of claim 4, wherein the at least one parameter adjustment includes at least one of a travel speed of the arc welding gun, a voltage applied, and a wire feed speed of the arc welding robot.

6. The adaptive welding apparatus of claim 5, wherein the controller is configured to pause forming the weld until a final temperature of at least one of the first workpiece and the second workpiece at the location is less than a predetermined maximum temperature and a weld schedule is selected.

7. The adaptive welding apparatus of claim 1, wherein the thermographic imager is repositionable by the arc welding robot.

8. The adaptive welding apparatus of claim 1, further comprising a database in communication with the controller for storing the joint profile.

9. A method of controlling an adaptive welding apparatus, the adaptive welding apparatus including an arc welding robot with a repositionable arc welding gun and a thermographic imager, the method comprising:

positioning the arc welding gun by a controller in signal communication with the arc welding robot and the thermographic imager at a location of a joint formed at an interface of a first workpiece and a second workpiece;

measuring with the thermographic imager at least one temperature including one or more of the following temperature measurements: an initial temperature, a temperature rate of change, and a final temperature of at least one of the first workpiece and the second workpiece at the location;

receiving by the controller the at least one measured temperature from the thermographic imager;

selecting a weld schedule by the controller for forming a weld at the location based on the at least one measured temperature and a joint profile of the location before the weld is formed, wherein the joint profile is determined based on material properties of the first workpiece and the second workpiece;

transmitting by the controller an operational control signal to the arc welding robot to activate the arc welding gun to form the weld; and forming the weld with the arc welding gun.

10. The method of claim 9, further comprising:

positioning by the controller the arc welding gun at a second location of the joint formed at the interface of the first workpiece and the second workpiece to form a second weld;

measuring with the thermographic imager at least one temperature of at least one of the first workpiece and the second workpiece at the second location;

receiving by the controller the at least one measured temperature from the thermographic imager;

selecting a weld schedule by the controller for forming the second weld at the second location based on the at least one measured temperature and a joint profile of the second location before the weld is formed;

transmitting an operational control signal to the arc welding robot to activate the arc welding gun to form the weld; and forming the second weld with the arc welding gun.

11. The method of claim 9, further comprising repositioning the arc welding gun and the thermographic imager at a second location of the joint to form a second weld between the first workpiece and the second workpiece.

12. The method of claim 9, wherein transmitting by the controller an operational control signal to the arc welding robot comprises transmitting a command signal to the arc welding robot to adjust at least one parameter for the selected weld schedule.

13. The method of claim 12, wherein the at least one parameter adjustment includes at least one of a travel speed of the arc welding gun, a voltage applied, and a wire feed speed of the arc welding robot.

14. A control system for an adaptive welding apparatus, the adaptive welding apparatus including an arc welding robot with a repositionable arc welding gun and a thermographic imager, the control system comprising:

a controller in signal communication with the arc welding robot and the thermographic imager, the controller configured to:

position the thermographic imager at a location of a joint formed at an interface of a first workpiece and a second workpiece to measure at least one temperature of at least one of the first workpiece and the second workpiece; and select a weld schedule for forming a weld at the location based on the at least one temperature measured with the thermographic imager and a joint profile of the location before the weld is formed, wherein the joint profile is determined based on material properties of the first workpiece and the second workpiece.

15. The control system of claim 14, wherein the controller is configured to transmit an operational control signal to the arc welding robot to activate the arc welding gun to form the weld.

16. The control system of claim 14, wherein the at least one temperature includes one or more of the following temperature measurements: an initial temperature, a temperature rate of change, and a final temperature of at least one of the first workpiece and the second workpiece at the location.

17. The control system of claim 16, wherein the controller is configured to transmit an operational control signal to the arc welding robot to adjust at least one parameter for the selected weld schedule.

18. The control system of claim 17, wherein the at least one parameter adjustment includes at least one of a travel speed of the arc welding gun, a voltage applied, and a wire feed speed of the arc welding robot.

19. The control system of claim 14, wherein the controller is configured to pause forming the weld until a final temperature is less than a maximum temperature and a weld schedule is selected.

20. The control system of claim 14, wherein the controller is in communication with a database storing the joint profile.

* * * * *